United States Patent [19]
Jensen

[11] 3,841,328
[45] Oct. 15, 1974

[54] AIRPLANE HIJACKING INJECTOR

[76] Inventor: Jack Jensen, 6325 Woodbine Dr., Fort Worth, Tex.

[22] Filed: Aug. 4, 1972

[21] Appl. No.: 278,008

[52] U.S. Cl. ......... 128/218 F, 128/218 A, 297/217, 244/122 R, 244/1 R
[51] Int. Cl. ............................................. A61m 5/20
[58] Field of Search ......... 128/218 R, 218 F, 218 P, 128/218 PA, 218 D, 218 G, 218 A, 215, DIG. 11, 216, 172, 1 R; 43/59, 58, 77; 244/1 R, 140, 141, 119, 122 R; 297/180, 188, 192, 216, 217, 463; 272/27 R, 27 N, 27 W; 340/52 R, 63, 64, 277; 109/1–6, 20, 29, 32, 36

[56] References Cited
UNITED STATES PATENTS

| | | | |
|---|---|---|---|
| 1,549,565 | 8/1925 | Stadler | 128/215 |
| 2,995,373 | 8/1961 | Cox | 128/215 X |
| 3,217,445 | 11/1965 | Wade | 128/218 R |
| 3,377,989 | 4/1968 | Sandhage et al. | 128/218 R |
| 3,641,998 | 2/1972 | Lyon et al. | 128/218 A |
| 3,658,277 | 4/1972 | Anderson | 244/119 X |
| 3,680,499 | 8/1972 | Boudreau | 244/1 R X |
| 3,704,845 | 12/1972 | Ord | 244/1 R X |
| 3,726,238 | 1/1972 | Gordon | 43/59 X |

FOREIGN PATENTS OR APPLICATIONS

| | | | |
|---|---|---|---|
| 2,019,296 | 11/1971 | Germany | 128/218 F |
| 375,108 | 2/1907 | France | 128/215 |

Primary Examiner—Richard A. Gaudet
Assistant Examiner—J. C. McGowan
Attorney, Agent, or Firm—Howard E. Moore; Gerald G. Crutsinger

[57] ABSTRACT

Passenger disabling apparatus mounted in and under an airplane seat and remotely actuated by a pilot or a crew member for disabling an airplane hijacker. The disabling apparatus comprises a solenoid actuated seat belt buckle lock in combination with an inflatable seat back and hypodermic injection apparatus arranged for driving the needle of a hypodermic syringe through the seat cushion into the passenger to instantly sedate or kill the passenger.

8 Claims, 10 Drawing Figures

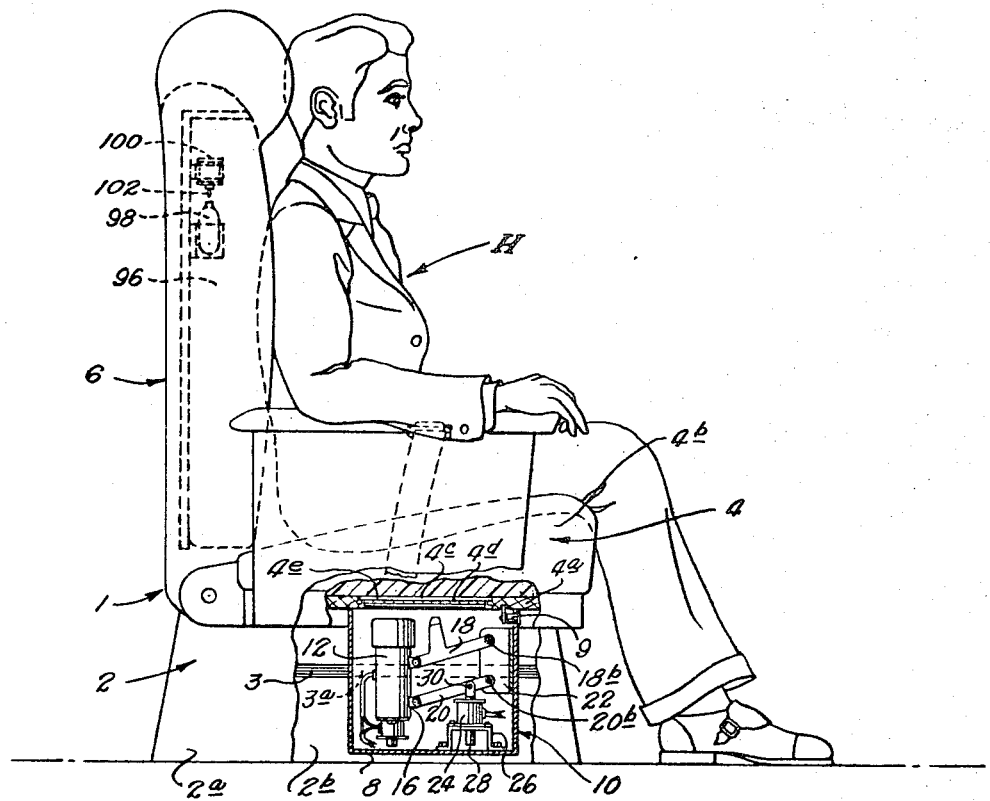
Fig. I
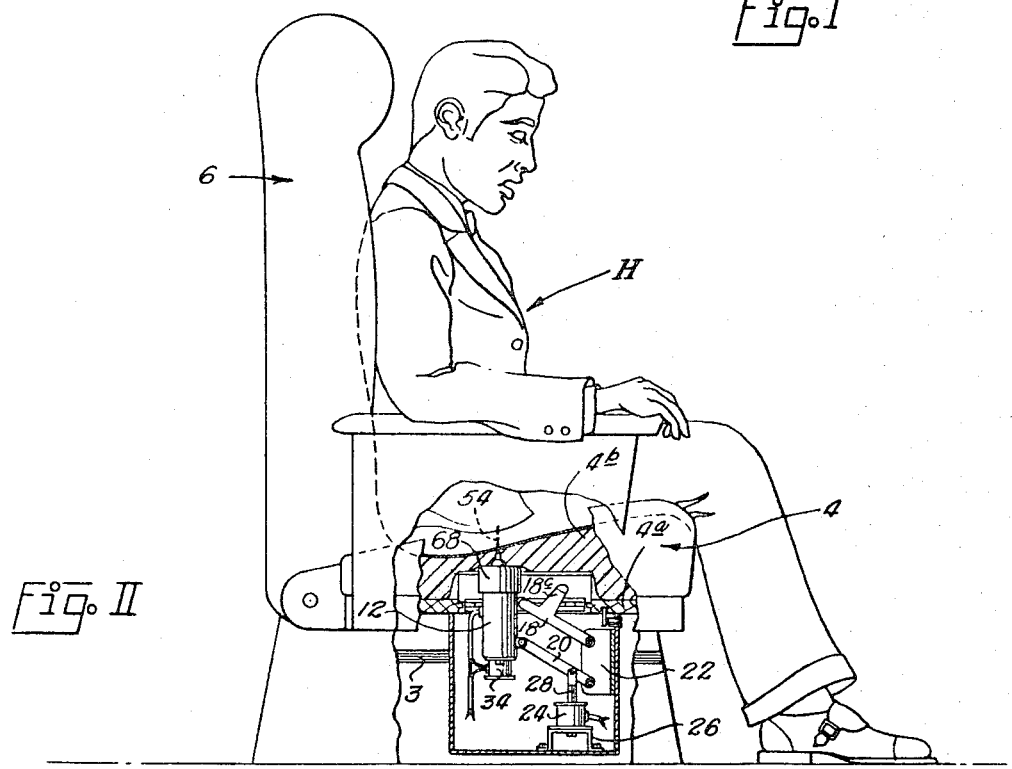
Fig. II

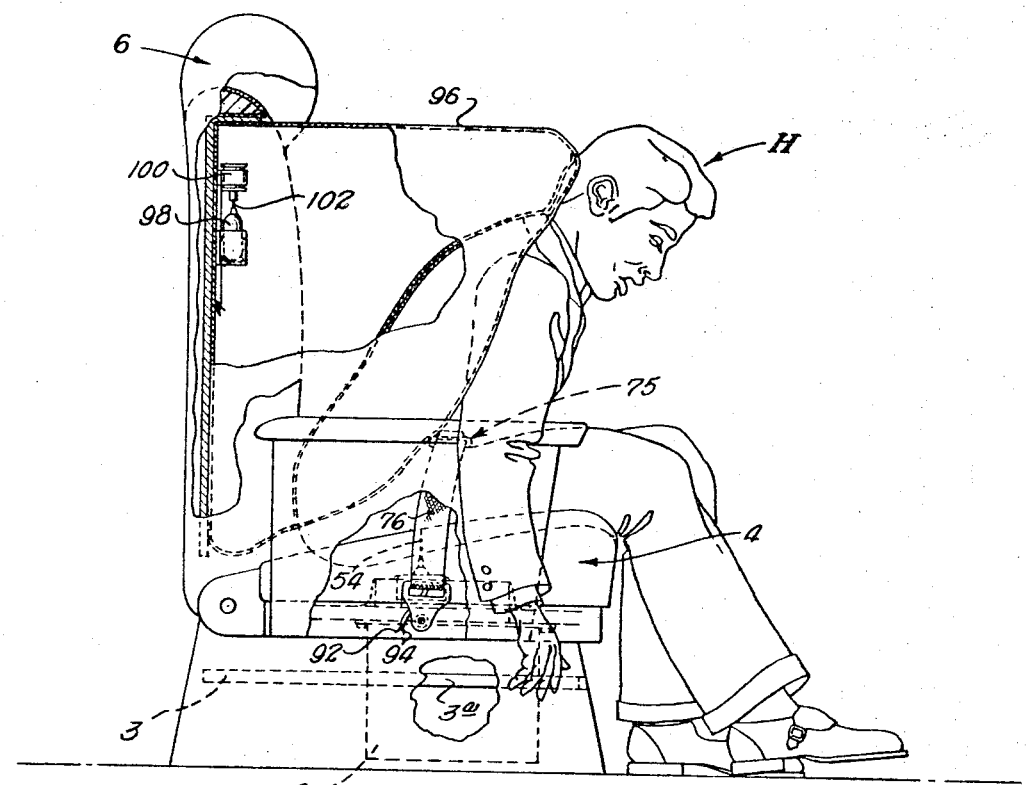
Fig. III
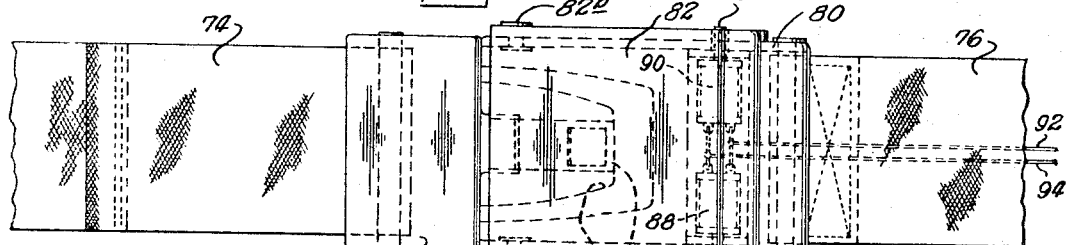
Fig. IV
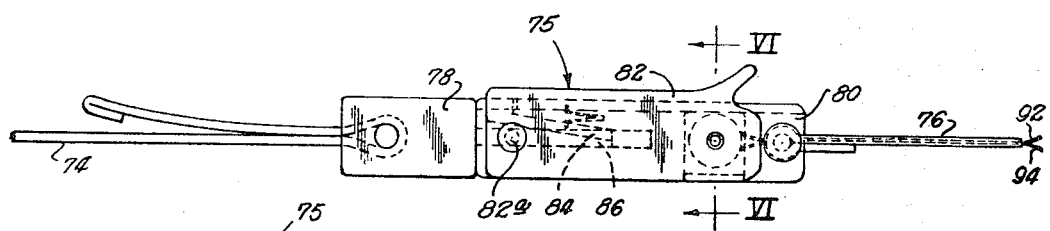
Fig. V
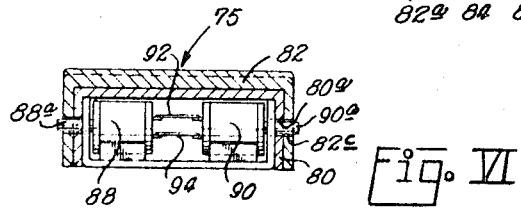
Fig. VI

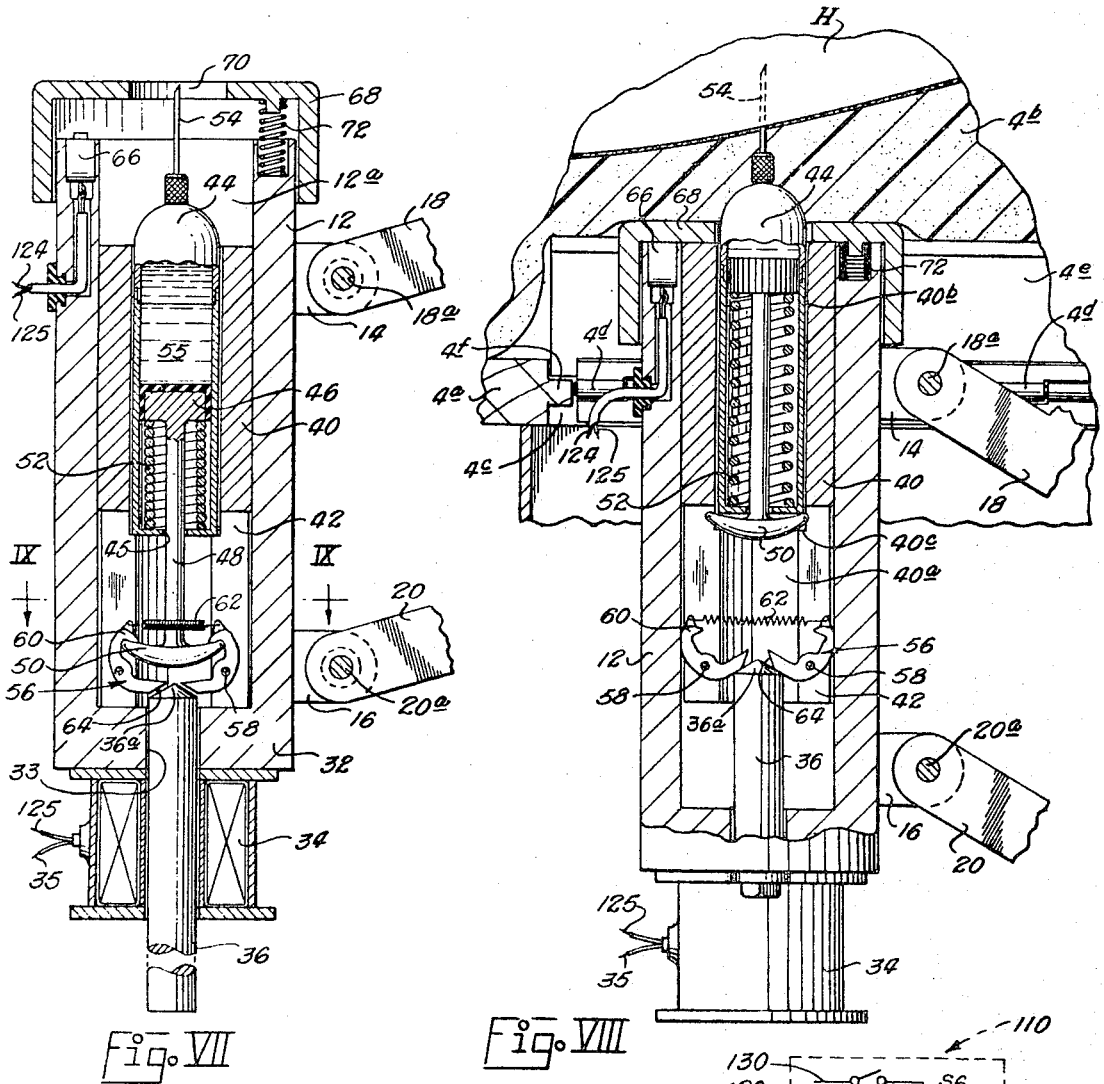
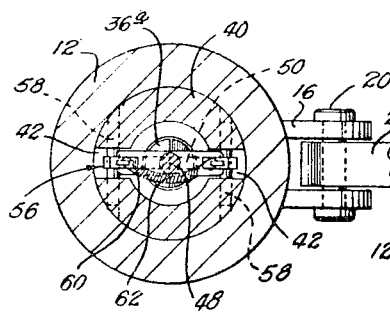
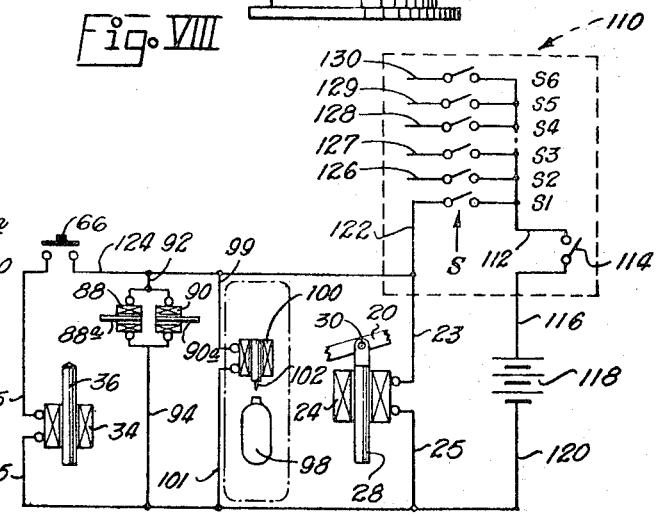

3,841,328

AIRPLANE HIJACKING INJECTOR

BACKGROUND OF THE INVENTION

Airplane hijackings are rapidly becoming occurrences which greatly endanger lives of both passengers and crew, result in loss of substantial property, result in inconvenience to passengers as a result of being wrongfully detained, and have caused substantial mental distress to a significant number of would-be passengers, such as Cuban refugees who run the risk of being detained at the destination of a hijacked airplane.

Heretofore airlines have adopted numerous measures to curb hijacking including observation of passengers, use of metal detecting devices, random searching of loading passengers, and the use of armed guards on the aircraft. Other measures have been considered including provision of bullet proof walls between the cabin of the aircraft and the passenger department and disrupting communication between the passenger compartment and the cabin of the aircraft between times of departure and landing.

However, such measures intended to curb airplane hijackings have been ineffective.

SUMMARY OF INVENTION

I have devised apparatus to be incorporated in each seat of an airplane such that the pilot or other crew member by performing a predetermined sequence of deliberate acts can remotely actuate the disabling apparatus associated with the seat occupied by the airplane hijacker for disabling or killing the hijacker without endangering other passengers.

The disabling apparatus comprises solenoid actuated seat belt locking means arranged to prevent the unlocking of a seat belt in combination with an inflatable seat back arranged to be to be actuated to prevent movement of a hijacker and a hypodermic syringe arranged to drive a needle through the seat cushion into the hijacker and to inject a sedative or deadly poison into the hijacker.

The seat belt buckle lock comprises solenoid actuated apparatus having a core arranged to extend through an aperture in the seat belt unlocking mechanism to prevent movement thereof.

The inflatable seat back comprises a solenoid actuated valve arranged to release pressurized gas, such as carbon dioxide, into a bag concealed in the back of the seat for suddenly urging the head and shoulders of the hijacket toward his knees while his hips are maintained against the back of the seat by a locked seat belt.

A hypodermic syringe is disposed under the seat of the airplane and is pivotally mounted on a frame such that a first solenoid actuated apparatus will drive the needle of the hypodermic syringe through the bottom seat cushion and into the hijacker at which time a second solenoid actuated device will automatically inject a strong sedative or poison for incapacitating the hijacker.

One or more switches arranged to actuate the seat belt buckle lock, the inflatable bag in the back of the seat, and the hypodermic syringe for each seat individually, switches being indicated by appropriate indicia, are preferably located on a switchboard in the pilot's compartment of the airplane such that when the pilot or other designated crew member, knowing the seat occupied by the hijacker, can manipulate the appropriate switches for disabling the hijacker.

A primary object of the invention is to provide concealed apparatus in an airplane seat for instantaneously disabling a hijacker without endangering other passengers aboard the airplane.

Another object of the invention is to provide injection apparatus particularly adapted for driving a needle on a hypodermic syringe through a seat cushion into a hijacker.

A still further object of the invention is to provide airplane hijacker disabling apparatus associated with each seat of an airplane such that the apparatus associated with a specific seat occupied by the hijacker can be remotely actuated to instantaneously incapacitate the hijacker.

Other and further objects of the invention will become apparent upon referring to the detailed description hereinafter following and to the drawings annexed hereto.

DESCRIPTION OF DRAWING

Drawings of a preferred embodiment of my invention are annexed hereto so that the invention may be better and more fully understood, in which:

FIG. I is a partially sectionalized side-elevational view of an airplane seat having the hijacker disabling apparatus mounted therein;

FIG. II is a partially sectionalized side-elevational view similar to FIG. I, the injection apparatus being illustrated in a triggered condition;

FIG. III is a partially sectionalized side-elevational view illustrating the inflatable bag in an inflated condition;

FIG. IV is the plan view of the seat belt buckle lock;

FIG. V is a side elevational view of the seat belt buckle lock;

FIG. VI is a cross sectional view taken substantially along line VI—VI of FIG. V;

FIG. VII is a cross sectional view of the hypodermic injection apparatus;

FIG. VIII is a cross sectional view of the hypodermic injection apparatus illustrated in a triggered condition;

FIG. IX is a cross sectional view taken substantially along line IX—IX of FIG. VII; and FIG. X is a wiring diagram of the electrical circuit.

Numeral references are employed to designate like parts throughout the various figures of the drawing.

DESCRIPTION OF THE PREFERRED EMBODIMENT

Referring to FIG. I of the drawing the numeral 1 generally designates an airplane seat having a general frame 2 supporting a cushion 4 and a hinged back 6.

The base frame 2 of the illustrated seat 1 has a pedestal tupe support comprising spaced side members 2a and 2b each of which has a groove 3 formed on inner surfaces thereof through which projections 3a on opposite sides of a housing 8 containing injector means 10 is disposed.

Housing 8 is attached to the support frame 2 by sliding projection 3a horizontally through groove 3 to a desired position and retaining housing 8 in position by actuating a conventional key actuated lock 9 having a bolt arranged to engage a stationary portion of frame 2 or a member secured thereto.

Cushion 4 comprises a sheet 4a of suitable material, such as wood, for supporting a resilient layer 4b of suitable material such as rubber, synthetic foam material, or the like. Rigid sheet 4a preferably has an opening 4c formed therein. Opposite sides of opening 4c preferably have hinges 4d secured thereto which permit doors 4e extending halfway across opening 4c to pivot upwardly to the position illustrated in FIG. III forming a passage therebetween through which a hypodermic apparatus extends as will be hereafter more fully explained.

Shoulders 4f extend along opposite sides of opening 4c, extending through sheet 4a, for supporting doors 4e when closed.

Injection means 10 comprises a tubular body 12 having lugs 14 and 16 extending outwardly therefrom. Levers 18 and 20, arranged to form a parallel linkage, have first ends connected by pins 18a and 20a to lugs 14 and 16, respectively, and have second ends connected by pins 18b and 20b to a hanger 22 secured to a wall of housing 8.

A solenoid 24, secured by a bracket 26 to housing 8, has a core 28 pivotally connected by a pin 30 to lever 20 of the parallel linkage secured to the tubular body 12 of injector means 10.

As best illustrated in FIGS. I and II lever 18 has an outwardly extending bumper 18c arranged to engage doors 4e extending across opening 4c in sheet 4a. As bumper 18c moves upwardly, doors 4e move upwardly forming space therebetween through which tubular body 12 and structure associated therewith is movable.

As will be hereafter more fully explained, when electrical current is directed through conductors 23 and 25 for energizing solenoid device 24, the core 28 will be extended causing the parallel linkage comprising levers 18 and 20 to move from the position illustrated in FIG. I to the position illustrated in FIG. II.

As best illustrated in FIGS. VII and VIII tubular body 12 has a closure 32 extending across the lower end thereof to which a solenoid 34 is secured. Solenoid 34 has a core 36 having inclined surfaces 36a on the upper end thereof, said core being slidably disposed through an opening 33 extending through closure 34 across the lower end of tubular body 12.

A tubular sleeve 40, having slots 42 formed in the wall adjacent the lower end thereof, is slidably disposed in bore 12a of tubular body 12. Sleeve 40 has a bore 40a extending therethrough, the upper end portion 40b of bore 40a being enlarged to form a shoulder 40c.

A hypodermic syringe comprising a cylindrical body 44 having a plunger 46 slidably disposed therein is received by the enlarged portion 40b of the bore extending through sleeve 40. Plunger 46 has a stem 48 extending through an aperture 45 formed in the lower end of cylinder 44 and has an enlarged lug portion 50 on the lower end thereof slidably disposed through slots 42 in sleeve 40.

A spring 52 is positioned in cylinder 44 and has a lower end resting against the bottom wall of cylinder 44 and the upper end resting against the lower surface of plunger 46 urging the plunger 46 in a direction away from aperture 45.

The upper end of cylinder 44 has a hypodermic needle 54 secured thereto through which fluid 55 in cylinder 44 is ejected.

Hook elements 56 are pivotally connected by pins 58 to sleeve 40 in slots 44 formed therein.

As best illustrated in FIGS. VII and VIII hook elements 56 have projections 60 on upper ends thereof arranged to be urged by a spring 62 into engagement with lug 50 on the lower end of stem 48 secured to plunger 46. Lower ends of hook elements 56 have surfaces 64 engagable by inclined surfaces 36a on core 36 of solenoid 34 for causing hook elements 56 to be pivoted to position illustrated in FIG. VIII wherein projections 60 disengage lug on stem 48.

The upper end of tubular member 12 has a switch 66, best illustrated in FIG. VII secured thereto.

A cap 68, having an opening 70 in central portion thereof, is slidably disposed over the upper end of tubular member 12. Resilient means, such as spring 72, urges cap 68 upwardly toward the position illustrated in FIG. VII. However, as will be hereinafter more fully explained, when cap 68 engages seat cushion 4 restraining movement thereof, cap 68 moves downwardly closing switch 66 for energizing solenoid 34 causing sleeve 40 to move upwardly to the position illustrated in FIG. VIII and driving the hypodermic needle 54 through cushion 4 into the hijacker H and causing hook elements 56 to release plunger 46 such that spring 52 forces fluid 55 through needle 54 into the hijacker.

In FIGS. IV, V and VI are illustrated sections 74 and 76 of seat belt having a buckle 75 securing the sections together. Buckle 75 comprises a male portion 78 arranged to be detachably secured in the female portion 80 by a clasp 82 pivotally secured in the female portion 80 and having a detent 84 resiliently urged into an aperture 86 in male portion 78 of the buckle.

For fastening seat belt 75 male portion 78 is inserted into female portion 80 and is retained therein by detent 84. For unfastening seat belt 75 clasp 82 is pivoted about hinge elements 82a and 82b disengaging detent 84 from aperture 86 permitting removal of male portion 78 from female portion 80.

To prevent a hijacker H from disengaging male portion 78 from female portion 80 of buckle 75 solenoids 88 and 90, having cores 88a and 90a, respectively, are disposed inside female portion 80 of buckle 75 and are arranged to prevent movement of clasp 82 to a position wherein detent 84 is disengaged from aperture 86.

Female portion 80 of the buckle has an aperture 80a extending therethrough and clasp 82 has an aperture 82c formed therein through which core 90a extends. Solenoids 88 and 90 are energized through conductors 92 and 94 concealed inside one of the sections 76 of the seat belt as will be hereinafter more fully explained.

As best illustrated in FIGS. I and III of the drawing, an inflatable bag 96 is secured to the back 6 of seat 1 and has a container 98 of pressurized gas, such as carbon dioxide, disposed therein. A solenoid 100 having a pointed core 102 is arranged for perforating container 98 for releasing the pressurized gas inside bag 96 for inflating same.

Referring to FIG. X of the drawing, a plurality of switches S, each of which is individually designated by indicia, for example, Si, S2, S3, S4, and S6, is positioned on a switchboard or control panel 110 which is preferably positioned in the cabin of the aircraft and accessible to the pilot. Each switch S1–S6 is connected through a conductor 112, master switch 114 and conductor 116 to a source of electricity, such as battery 118. Battery 118 is connected through a conductor 120 to windings of solenoids 24, 34, 88, 90 and 100.

Switch S1 is connected through a conductor 122 to the opposite sides of the windings of solenoids 24, 34, 88, 90 and 100, as will be hereinafter more fully explained in the description of the operation of the apparatus, for actuating the solenoid devices.

It should be noted that conductor 122 is connected through a conductor 124 and switch 66 to conductor 125 associated with solenoid device 34.

Switches S2, S3, S4, S5 and S6 are connected through conductors 126–130 to solenoid devices associated with other seats of the aircraft.

The operation and function of the apparatus hereinbefore described is as follows:

When a hijacker H sits in a seat 1 of the airplane and fastens seat belt 75, a crew member of the aircraft will advise the pilot, or other designated peron, which specific seat is occupied by the hijacker.

The pilot then closes master switch 114 and closes the appropriate switch S, for example, the switch indicated by indicia S1, thereby connecting one terminal of battery 118 through conductor 116, master switch 114, conductor 112, switch S1, conductor 122 and conductor 92 to one side of the windings of solenoids 88 and 90. Opposite sides of the windings of solenoids 88 and 90 are connected through conductor 94 and conductor 120 to the opposite terminal of battery 118. When the windings of solenoids 88 and 90 are energized cores 88a and 90a extend into apertures 80a and 82c, as illustrated in FIG. VI, to prevent unlocking seat belt 75.

Closing switch S1 connects opposite sides of windings of solenoid 100 through conductors 99 and 101 to opposite terminals of battery 118 causing the pointed core 102 to be extended causing pressurized gas to be released from container 98 for expanding bag 96 concealed in the back 6 of the seat to the position illustrated in FIG. III. When bag 96 is suddenly inflated the hijacker will be knocked forward such that movement will be significantly restrained.

Closing of switch S1 further connects solenoid 24 to opposite terminals of battery 118 through conductors 23 and 25 causing core 28 to be extended. As core 28 is extended levers 18 and 20 are pivoted upwardly about the pins 18b and 20b from the position illustrated in FIG. I to the position illustrated in FIG. II. Bumper 18c on lever 18 moves into engagement with doors 4e causing the doors to pivot upwardly forming a passage between the edges of the doors and centrally of opening 4c through which cap 68 on tubular member 12 of injection apparatus 10 is moved.

As best illustrated in FIG. VIII, movement of cap 68 into engagement with cushion 4b of seat 4 causes tubular body 12 to move into cap 68 compressing spring 72 which causes switch 66 to be closed.

As switch 66 closes opposite sides of the winding of solenoid 34 are connected to opposite terminals of battery 118 through conductors 124, switch 66, conductor 125 and through conductor 35. When the coil of solenoid 34 is energized core 36 is extended moving sleeve 40 upwardly which drives the hypodermic needle 54 through the seat cushion 4b into the hijacker H.

When the upper end of sleeve 40 engages cap 68, core 36 continues to move upwardly causing hook elements 86 to be pivoted to the position illustrated in FIG. II thereby disengaging lug 50. As lug 50 is released spring 52 moves plunger 46 through cylinder 44 of the syringe thereby forcing fluid 55 through needle 54 into the hijacker to immediately incapacitate the hijacker.

It should be readily apparent that the apparatus hereinbefore described and illustrated in the attached drawing accomplishes the objects of the invention hereinbefore discussed.

It should be readily apparent that the foregoing description discloses details of construction of a preferred embodiment of my invention. However, other and further embodiments may be devised without departing from the basic concept thereof.

Having described my invention, I claim:

1. Injector apparatus comprising, a general frame; a rigid sheet having an opening extending therethrough; means to secure said rigid sheet to said frame; a door; means to moveably secure said door to said rigid sheet; a resilient cushion supported by said rigid sheet; link means pivotally secured relative to the frame; bumper means on said link means to move said door relative to said rigid sheet; a hypodermic syringe having a plunger slidably disposed therein; a hollow needle attached to said hypodermic syringe, said plunger being arranged to force fluid through said hollow needle; means securing the syringe to said link means; means to pivot the link means relative to the frame such that the bumper engages the door and the needle is urged through the resilient cushion; and means to move the plunger to eject fluid through the hollow needle.

2. The combination called for in claim 1 wherein the link means comprising first and second links of substantially equal lengths arranged to form a parallel linkage such that upon movement of said links the needle on the syringe is maintained in a substantially vertical orientation.

3. The combination called for in claim 1 wherein the means securing the syringe to the link means comprises, a tubular body pivotally secured to the link means, said tubular body having a bore formed therein in which the syringe is disposed; and wherein the means to move the plunger comprises means secured to the tubular body and to the plunger of the syringe.

4. In combination with a seat, hypodermic injector means arranged to inject fluid into a person occupying the seat; means securing the hypodermic injector means relative to the seat; actuated means associated with the hypodermic injector means adapted to dispense fluid from the injector means; actuating means located remotely from the injector means, said actuating means being adapted to actuate the actuated means to inject fluid; an inflatable bag secured to the seat; a source of pressurized fluid; and means actuated by the actuating means to deliver fluid from said source to the bag.

5. In combination with a seat; hypodermic injector means arranged to inject fluid into a person occupying the seat; means securing the hypodermic injector means relative to the seat; actuated means associated with the hypodermic injector means adapted to dispense fluid from the injector means; actuating means located remotely from the injector means, said actuating means being adapted to actuate the actuated means to inject fluid; a seat belt having sections secured to said seat; a buckle arranged to connect said sections;

and means actuated by said actuating means to lock said buckle to prevent disconnecting of said sections.

6. Injector apparatus comprising, a general frame; a cushion supported by said frame; link means pivotally secured relative to the frame; a hypodermic syringe having a plunger slidably disposed therein; a hollow needle attached to said hypodermic syringe, said plunger being arranged to force fluid through said hollow needle; resilient means initially mounted in compression associated with the syringe arranged to urge the plunger through the syringe; a tubular body pivotally secured to the link means, said tubular body having a bore formed therein in which the syringe is disposed; means to pivot the link means relative to the frame such that the needle is urged through the cushion; solenoid means having a moveable core; means to secure said solenoid means to said tubular body; and means detachably securing the plunger to the core such that the plunger is disengaged permitting movement thereof by the resilient means when the solenoid is energized.

7. Injector apparatus comprising, a general frame; a cushion supported by said frame; link means pivotally secured relative to the frame; a hypodermic syringe; a hollow needle secured to said syringe; a plunger slidably disposed in said syringe, said plunger being arranged to force fluid through said hollow needle; a tubular body pivotally secured to the link means, said tubular body having a bore formed therein; a hollow sleeve slidably disposed in the bore of the tubular body, said syringe being slidably disposed in the hollow portion of the sleeve; resilient means associated with the syringe arranged to move plunger through the syringe; means on said sleeve arranged to detachably secure the plunger to the sleeve; means to pivot the link means relative to the frame such that the needle is urged through the cushion; means secured to the tubular body arranged to move the sleeve through the bore in the tubular body until movement thereof is restricted at which time the plunger is disconnected from the sleeve permitting movement of the plunger by the resilient means for discharging fluid from the needle.

8. The combination called for in claim 7 wherein the means to detachably secure the plunger relative to the sleeve comprises solenoid means having a movable core; and hook means pivotally secured to the sleeve and engaging the plunger such that movement of the core against the hook means moves the sleeve until movement is restrained causing the hook means to pivot out of engagement with the plunger.

* * * * *